United States Patent [19]
Dorn

[11] 3,883,425
[45] May 13, 1975

[54] DETOXIFICATION OF SAPONINS

[75] Inventor: Gordon L. Dorn, Dallas, Tex.

[73] Assignee: J. K. & Susie L. Wadley Research Institute and Blood Bank, Dallas, Tex.

[22] Filed: Dec. 10, 1973

[21] Appl. No.: 423,447

[52] U.S. Cl.............. 210/23; 210/31 C; 260/210.5
[51] Int. Cl............................................ B01d 13/00
[58] Field of Search.................. 210/23, 321, 31 C; 260/210, 210.5

[56] References Cited
UNITED STATES PATENTS

| | | | |
|---|---|---|---|
| 2,172,265 | 9/1939 | Waltz | 260/210.5 X |
| 2,301,787 | 11/1942 | Nord | 260/210 |
| 2,715,122 | 8/1955 | Ruthman et al. | 260/210.5 |
| 2,790,793 | 4/1957 | Buedecker | 260/210.5 |
| 2,791,581 | 5/1957 | Wall et al. | 260/210.5 |
| 3,158,606 | 11/1964 | Wehzler et al. | 260/239.55 |
| 3,170,916 | 2/1965 | Dziengel | 260/210.5 |
| 3,446,751 | 5/1969 | Weichselbaum | 252/408 |
| 3,450,691 | 6/1969 | Wagner et al. | 260/210.5 |
| 3,464,972 | 9/1969 | Rocher | 260/210.5 |
| 3,526,588 | 9/1970 | Michaels et al. | 210/23 |

OTHER PUBLICATIONS

Michaels, "New Separation Technique for the CPI," from Chemical Engineering Progress, Vol. 64, No. 12, Dec., 1968, pages 31-43.

*Primary Examiner*—Frank A. Spear, Jr.
*Attorney, Agent, or Firm*—Richards, Harris & Medlock

[57] ABSTRACT

Saponin material extracted from plants is purified and made nontoxic to microbial organisms by removing constituents from an aqueous solution of the saponin extract which have an apparent molecular weight of less than about 600 in the aqueous solution. In a preferred embodiment, an aqueous solution of saponin is prepared and then passed through a filter membrane having average pore sizes no smaller than about 11 angstroms in diameter and no larger than about 24 angstroms in diameter while adding amounts of pure aqueous solvent to the solution approximately equal in volume to the liquid passing through the membrane. The toxic material will be in the liquid passed through the membrane.

14 Claims, 1 Drawing Figure

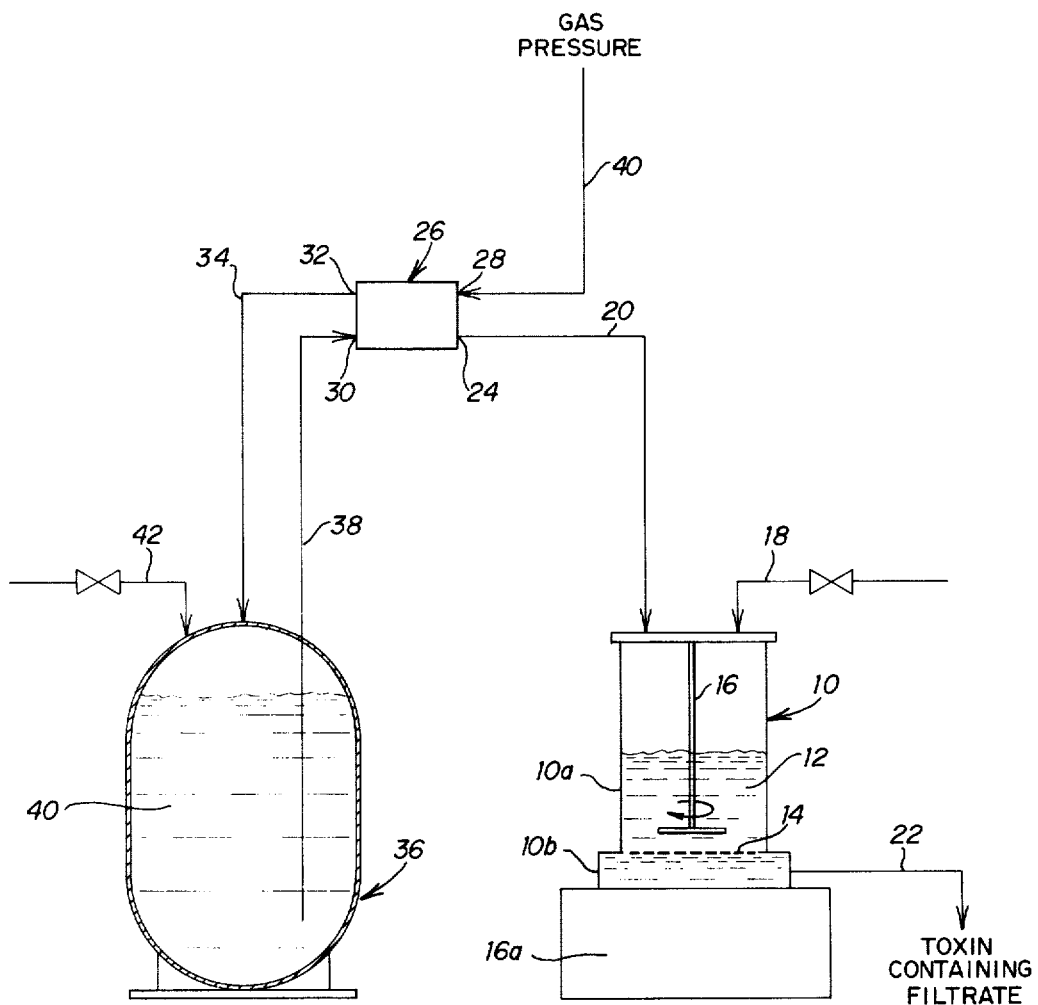

DETOXIFICATION OF SAPONINS

This invention relates to saponins. In another aspect, this invention relates to the detoxification of commercial saponin extracts.

Saponins are glycosides widely distributed in plants and are capable of forming oil-in-water emulsions, and act as protective colloids. Each saponin molecule consists of a sapogenin which constitutes the aglucone moiety of the molecule, and a sugar.

The sapogenin is either a triterpenoid (usually a pentacyclic structure, such a quillaic acid), or a stearoid structure (usually having a spiro acetal side chain as in diosgenin). The sugar portion of the saponin glucoside includes one or more sugars such as glucosee, sucrose, xylose, a pentose or methyl pentose, or other sugars. On hydrolysis, the saponins yield the sapogenin and one or more of these sugars, glucose, Commercially available saponins comprise a white to brown amorphous powder which is pungent, and has a disagreeable taste and odor. This powder is very soluble in water and foams very strongly when shaken with water.

Commercial saponins are prepared by extracting plant tissue with water and/or other organic solvents, such as alcohol and recovering saponin by precipitation, recrystallization and the like. Saponins are widely distributed in plants. For example, saponins are very widely distributed in the plant family caryophyllaceae. Specific examples of saponin sources include soap bark, panama wood, soap berry, liquorice, and the like. A specific example of a process for producing commercial saponin is described in Kingzette's Chemical Encyclopedia, D. H. Hey, 9th Edition, (1966) which includes either extracting powdered soap bark (*Quillaria saponaria*) with hot alcohol or by boiling powdered dry aqueous extract of such bark with alcohol, and allowing saponin to crystallize from the alcohol upon cooling.

Saponins are practically nontoxic to humans upon oral ingestion, but act as powerful hemolytics when injected into the bloodstream, thereby dissolving the red blood corpuscles. Because of this characteristic, saponins have been conventionally used in hemotology laboratories for lysing the red cells whenever their presence interferred with other procedures, e.g., hemoglobin determinations and white cell counts.

Even though saponins have been utilized in hemotology laboratories for lysing red blood cells in such procedures as hemoglobin determinations and white cell counts, they have not been used in conventional blood culture techniques which require the removal of corpuscular components of the blood, such as the conventional millipore filtration method, because the commercial saponin preparations generally are highly toxic to the microbial constituents which may be in the blood sample.

In the millipore filtration method for determining microbial pathogens, the blood cells are initially separated from the serum of a blood sample by conventional techniques, e.g., centrifugation or lysing. Thereafter, the remaining serum is passed through a millipore filter that traps particles the size of bacteria or larger. The filters are then placed on a nutrient agar plate and subjected to conditions which will allow the microorganisms to grow. The presence of microorganisms on the plate will be detected by the appearance of individual colonies in approximately 24 hours. Thus, because most commercial saponin extracts are toxic to microbial pathogens, such extracts have not been used as a detergent in any technique which requires that the detergent contact microorganisms such as bacteria and the fungi without destroying the same.

According to the subject invention, I have discovered that saponins are not toxic to microbial pathogens and other microorganisms. More specifically, I have found that most of the commercial saponin preparations which are produced by extracting saponin from plants are toxic because of the presence of constituents therein which have an apparent molecular weight in aqueous solution which is not greater than about 600, e.g., an apparent molecular weight size between about 140 and about 600. In essence, I have found that when such materials are removed from commercial saponin preparations, the remaining saponin functions very efficiently as a hemolytic but yet is not toxic to microorganisms. Thus, I have found that saponin preparations purified in accordance with my invention can be utilized to lyse blood (remove the red corpuscle components of the blood) in blood culture techniques without destroying or deleteriously affecting the microbial pathogens to be cultured.

In accordance with a preferred embodiment of the subject invention, commercial saponin extracts from plants are detoxified by forming an aqueous solution thereof and thereafter, passing the solution through a millipore filter which has a mean actual pore size no smaller than about 11 angstroms in diameter and no larger than about 24 angstroms in diameter. The aqueous solution which passes through the millipore filter will contain the antimicrobial toxin. This ultra filtration technique is preferably accomplished by a continuous process wherein volumes of pure aqueous solvent equal in amount to the effluent passing through the millipore filter are continuously added to the aqueous solution containing the saponin until the microbial pathogen is efficiently removed therefrom.

Commercial saponins can be purchased basically in three grades, i.e., crude; purified; and highest purity, which are also commonly known as practical grade, purified grade, and reagent grade, respectively. Generally, these commercial saponins which are complex mixtures and come from a variety of plant sources, vary both in their lysing potential and the percentage of extraneous materials including microbial toxins. It has been found that most, if not all, of these commercial saponins do in fact, contain toxins for microorganisms, and these toxins have an apparent molecular weight in aqueous solution which is not greater than about 600 and generally have an apparent molecular weight in aqueous solution of between about 150 and about 600. Furthermore, it has been found that even though saponins have a molecular weight of between 1,000 and 2,000, they will have an apparent molecular weight in aqueous solution of a much greater magnitude and therefore are easily separated from the microbial toxin material in aqueous solution. It is not exactly understood why the saponins have a relatively high apparent molecular weight in aqueous solution (much greater than their actual molecular weight), but it is theorized that since saponins are nonionic detergents, it is possible that they exist in solution as micelles, i.e., units of structure built up from molecules or ions.

Thus, according to the subject invention, commercial saponin preparations which are toxic to microorganisms are purified by initially forming an aqueous solution of the saponin preparation and thereafter removing the components therefrom which have an apparent molecular weight less than about 600 in the aqueous solution and generally, which will pass through a millipore sieve having an average pore diameter of between about 11 and about 24 angstroms in diameter.

As stated, the antimicrobial toxins which exist within these commercial saponin preparations generally have a molecular weight in a solution greater than about 150 and less than about 600. These materials can be separated from aqueous solutions of saponin by any conventional separation techniques which includes gel filtration, dialysis, and ultrafiltration. Generally, a continuous ultrafiltration type process is preferred.

This invention can be more easily understood from a study of the drawing which is a schematic illustration of a continuous ultrafiltration process for removing antimicrobial toxins from commercial saponin preparations in accordance with the subject invention.

Referring to the drawing, a process and apparatus are schematically depicted illustrating a preferred embodiment of the subject invention. This embodiment can be utilized to effect a continuous ultrafiltration process for the removal of antimicrobial toxins from aqueous solutions of commercial saponin extracts. As shown, ultrafiltration vessel 10 is divided by microporous filter membrane 14 into an upper compartment 10a for receiving an aqueous solution 12 of saponin extract, and a lower compartment 10b for receiving toxin-containing filtrate.

Microporous filter membrane 14 can be any conventional ultrafiltration membrane known in the art which has a mean actual pore size no less than about 11 angstroms in diameter and no larger than about 24 angstroms in diameter. Suitable such membranes are sold by the Scientific Systems Division of Amicon Corporation of Lexington, Massachusetts under the trademarks of UM05, UM2, UM10, PM10, PM30, and the like. Furthermore, ultrafiltration vessel 10 can be a standard Amicon stirred ultrafilter cell which is also marketed by Scientific Systems Division of Amicon Corporation of Lexington, Mass.

The upper chamber 10a is equipped with stirrer 16 and contains a suitable sample inlet means such as assembly 18 and solvent inlet means which communicates with conduit 20. Stirrer 16 can be operated either by a direct drive motor or a rotary magnet such as positioned within block 16a. Chamber 10b has an outlet which communicates with outlet conduit 22 for removing toxin-containing filtrate therefrom.

As shown in the drawing, conduit 20 communicates between port 24 of valve 26 and an inlet in the upper region of ultrafiltration vessel 10. Valve 26 carries valve ports 24, 28, 30 and 32, and when placed in a first position, valve port 28 will communicate to valve ports 32 and 24 but when placed in a second position, valve port 28 will communicate with valve port 32 and valve port 30 will communicate with valve port 24. Conduit 34 communicates between the upper region of solvent tank 36 and valve port 32. Conduit 38 communicates between a lower region of the interior of solvent tank 36 and valve port 30. Conduit 40 communicates between a suitable gas pressure source, e.g., compressed air or nitrogen, and valve port 28 of valve 26. Valve 26 can comprise the concentration/dialysis selector CDS10 sold by Scientific Systems Division of Amicon Chemical Corporation of Lexington, Mass.

As shown, solvent tank 36 can comprise any suitable enclosed pressure vessel and contains an inlet assembly 42 for receiving quantities of solvent therein, and inlet means which communicate with conduit 34, and conduit 38

Initially, in the operation of the process and apparatus schematically illustrated in the drawing, an aqueous solution of a commercial saponin extract is prepared. The solution can contain from about 5 to about 50 (W/V) of commercial saponin extract, but preferably contains from about 20 to about 40% (W/V) of the saponin extract. The saponin solution can be made with distilled water or with normal saline solution, for example. This solution is then passed to the interior of chamber 10a of ultrafiltration vessel 10 via inlet assembly 18 and is thereby positioned above microporous filter membrane 14.

Next, the solvent used to make the aqueous saponin solution, e.g., distilled water or normal saline, is added to the interior of solvent tank 36 via inlet assembly 42. Generally, it is preferred that the amount of solvent added to solvent tank 36 equal at least two and preferably at least 5 equivalent volumes of the aqueous saponin solution which was added to chamber 10a of ultrafiltration vessel 10. After this is accomplished, valve 26 is placed in its first position such that valve port 28 communicates with valve port 32 and valve port 24 and valve port 30 are closed to thereby place uniform gas pressure upon the surface of the solvent 40 within solvent tank 36 and the surface of the aqueous saponin solution 12 within chamber 10a of ultrafiltration vessel 10. The pressure which is applied is generally greater than atmospheric and can vary with the porosity of the microporous filter membrane 14 but generally is within the range of from about 2 to about 10 atmospheres. For example, when using a PM10 membrane described above which has a rated exclusion limit of 10,000 MW (about 18 angstroms average pore diameter), a pressure of about 50 pounds per square inch at room temperature can be utilized.

After the pressure in the interior of solvent tank 36 and ultrafiltration vessel 10 is equalized at the elevated value, then valve 26 is switched to its second position, which thereby allows valve port 28 to communicate with valve port 32, and valve port 30 to communicate with valve port 24. The stirring mechanism 16 is actuated such that the liquid adjacent the upper surface of microporous filter membrane 14 is constantly in agitation.

The pressure within chamber 10a of ultrafiltration vessel 10 will cause the solvent containing the lower molecular weight constituents including any microbial toxins normally contained within the commercial saponin extract to pass within chamber 10b of ultrafiltration vessel 10. The liquid from chamber 10b is passed to a reservoir and discarded via conduit 22.

Since the pressure on the interior of solvent tank 36 and chamber 10a of ultrafiltration vessel 10 are the same, the displacement of liquid from the interior of chamber 10a will result in a like volume of solvent passing from solvent tank 36 into the upper portion of chamber 10a of ultrafiltration vessel 10 via conduit 38, valve 26, and conduit 20. This process continues until the desired quantity of solvent has passed from solvent tank 36 to chamber 10a of ultrafiltration vessel 10. Generally, it is preferred that at least two equal volumes (Volumes equal to the original aqueous saponin solution placed within chamber 10a) and preferably at least 5 equal volumes of solvent be passed into chamber 10a via conduit 20. After this procedure, the aqueous saponin solution 12 is free of toxin material and can be utilized to lyse red blood cells in a serum sample which is later subjected to a bacterial culturing procedure, for example.

Generally, the process can be carried out using a microporous filter membrane which has exclusion limits of molecules having a molecular weight of from about 600 to about 30,000. This is quite unique as explained above, because saponins normally have a molecular weight of between 1,000 and 2,000. Any suitable microporous filter membrane can be utilized which will effectively separate the toxins having an apparent molecular weight in aqueous solution of between about 150 and about 600. As stated above, any other suitable separation technique such as gel filtration techniques can be utilized to separate the toxin from the saponin in the scope of the subject invention. The saponin can be purified such that greater than 99% of the toxin is removed therefrom by the process of the subject invention. The resulting saponin can be utilized as a lysing agent for blood preparatory to blood culturing techniques, e.g., the millipore filtration method described above, or it can be of value in the disaggregation of bacteria and fungal cells for the accurate quantitation of viable cells present in solution, or it can be used in cellular membrane analysis which requires a gentle, nontoxic detergent action, for example.

The following examples are given to better facilitate the understanding of this invention and are not intended to limit the scope thereof.

EXAMPLE 1

Initially, several commercial saponin preparations were tested for hemolysis as well as toxicity to microorganisms. In each instance, a 40% (W/V) aqueous solution of the saponin was made up. Next, the hemolysis of each sample was tested. The assay for hemolysis was based on the ring size of hemolysis produced on blood agar plates. The blood agar plates contained 5% sheep blood cells and trypticase soy agar. One-half milliliter of each of the aqueous saponin solutions was added to a blood agar plate and the solution hemolyzed the blood cells on the plate as it diffused outwardly thereon. The area of hemolysis (ring size) was read after the plates were incubated at room temperature overnight. In addition, samples of each of the aqueous saponin solutions was assayed for bacterial toxicity. The assay for bacterial toxicity was based on the measurement of ring size on agar plates seeded with *Staphylococcus aureus*. Each of the *Staphylococcus* agar plates was prepared as follows:

a. a layer of 10 milliliters of agar medium (which was made by admixing 10 grams of a commercially available nutrient broth purchased from Difco, 10 grams of Casamino acid, and 1,000 grams of distilled water) was placed on a sterile plate, and then allowed to harden; and b. two milliliters of an overnight culture of *Staphylococcus aureus* was mixed with 100 milliliters of rich agar medium defined above, and 7 milliliters of this solution was overlayed on the existing 10 milliliters which had dried in the bottom of the plate. Next, wells were cut in the assay plates and filled with 0.1 milliliters of each of the aqueous saponin solutions to be assayed. The *Staphylococcus aureus* plates were then incubated at 35°C overnight and the ring sizes were measured.

The results of the homolysis and bacterial toxicity tests are set forth in Table I below:

TABLE I

Toxicity of Various Types of Commercially Available Saponin

| Sample No. | Brand | Grade | Lot No. | Ring Size (mm) hemolysis | inhibition |
|---|---|---|---|---|---|
| 1 | Cal Bio Chem | reagent | 200615 | 24.15 mm | 42.0 mm |
| 2 | Nutritional Bio-chemical Corp. | reagent | 7148 | 24.0 mm | 37.0 mm |
| 3 | Coulter Diagnostic Corp. | reagent | 113 | 26.0 mm | 36.0 mm |
| 4 | Nutritional Bio-chemical Corp. | reagent | 7123 | 26.0 mm | 34.0 mm |
| 5 | Nutritional Bio-chemical Corp. | practical | 6356 | 19.0 mm | 20.1 mm |
| 6 | Baker Chemical Co. | purified | 35395 | 21. mm | 16.0 mm |
| 7 | Eastman Chem.Co. | practical | 711A | 25. mm | 9.0 mm |
| 8 | Sigma Chem. Co. | reagent | g2C-0050 | 23. mm | 9.0 mm |

As can be seen from a study of Table I, the commercially available saponin preparations will hemolyze blood in differing degrees, and are all toxic in one degree or another to microbial organisms. It is especially noted that even the reagent grade preparations contain substantial levels of the antimicrobial toxins. This toxicity prevents these commercially available saponins from being utilized in blood culturing procedures.

EXAMPLE II

Several gel filtration separations were carried out on eight sample aqueous saponin solutions identical to those set forth in Table 1, and hemolysis as well as bacterial toxicity measurements were made on the separated constituents.

Initially, three columns were prepared. The first column was filled with a crosslinked dextran sold under the trademark of Sephadex G-10 by Pharmacia Fine Chemicals, Inc. The Sephadex G-10 has a molecular weight exclusion limit of above about 700. The second column was filled with a crosslinked dextran sold under the trademark of Sephadex G-75 by Pharmacia Fine Chemicals. This material has a molecular weight exclusion limit of about 50,000. The third column was made with a crosslinked acrylamide sold under the trademark of BIO-GEL P2 by Bio-Rad, Inc. The Bio-Gel P2 material has a molecular weight exclusion limit of about 1800.

The columns were prepared by swelling the Sephadex G-10 and Bio-Gel P2 materials for 3 hours in deionized water. The Sephadex G-75 was swollen in 0.9% sodium chloride aqueous solution. The various calibration markers for each of the columns was prepared in 10% (W/V) solutions and 0.2 milliliters of these solutions were applied to the columns. The operating conditions and the standards used to calibrate each of the columns are set forth in Table 2 below:

TABLE 2

|  | Sephadex G-10 | Sephadex G-75 | Bio-Gel P-2 |
|---|---|---|---|
| Height | 23. cm | 27. cm | 54. cm |
| Diameter | 1.5 cm | 1.5 cm | 11 0.9 cm |
| Flow Rate | 0.8 ml/min | 0.3 ml/min | 0.5 ml/min |
| Vo (Blue Dextran) | 8.5 ml | 13. ml | 9.5 ml |
| Vt | 40.6 ml | 48. ml | 34. ml |
| Vi | 20.0 ml | 33. ml | 17.8 ml |
| $^{y}CoCl_3$ | 19. ml | 39. ml | 30. ml |
| $^{y}1,450$ (bacitracin)* | — | 36. ml | — |
| $^{y}12,500$ (cytochromeC)* | — | 24. ml | — |
| $^{y}17,800$ (myoglobin)* | — | 22. ml | — |
| $^{y}25,000$ ($\alpha$-chymotrypsin)* | — | 21. ml | — |

Vo=excluded volume, determined from center of blue dextran peak
Vt=bed volume of column
Vi=calculated volume for a species completely included Vi =

$$(Vt-Vo) \frac{Wr \cdot d}{1+Wr}$$

Wr=water regain, d=density

*exclusion volume (volume which comes off of the column of a compound having the molecular weight shown in the subscript after V)

Each of the eight commercial saponin preparations which were utilized in Example I above were run through the three columns. The saponin samples run through the columns were approximately 0.2 milliliters of a 40% (W/V) solution of the solvent used to swell the column containing the saponin tested. Likewise, the affluent for each column was the same as the solvent used in swelling the gel therefor. The column effluent was collected on an LKB ultra rack fraction collector and a 280 MU profile was automatically recorded. After the $V_o$ (void volume) had been collected from each column on each run, each half milliliter fraction was assayed for hemolysis activity and bacterial inhibition potential by the methods set forth in Example I above. The results are set forth in Tables 3 and 4 below:

TABLE 3

Kd and Approximate Molecular Weights of the Antimicrobial Toxin in Various Commercial Saponin Preparations

|  | Molecular Weight | Kd* | Sample No. | Column |
|---|---|---|---|---|
| Sephadex | 165 | .75 | 2 | G-10 |
|  | 190 | .67 | 2 | G-10 |
|  | 180 | .70 | 4 | G-10 |
|  | 175 | .72 | 1 | G-10 |
|  | 175 | .72 | 1 | G-10 |
|  | 180 | .70 | 1 | G-10 |
|  | 150 | .80 | 3 | G-10** |
|  | 580 | .10 | 6 | G-10 |
| Bio Gel | 145 | .87 | 4 | P-2 |
|  | 162 | .84 | 3 | P-2 |
|  | 155 | .86 | 1 | P-2 |

* The distribution coefficient for a solute between the water in the gel grains and the surrounding water is designated Kd. A substance with a Kd = 0 is completely excluded from the gel grains and a substance with a Kd = 1 has free access to the water within the gel grains.

$$Kd = \frac{Ve - Vo}{Vi}$$

Where Ve is the elution of the substance in question; Vi is the water volume inside the gel grains; and Vo is the volume of water outside the gel grains.

**run in NaCl, 0.9%

TABLE 4

Kd and Approximate Molecular Weight of Various Commercial Saponin Preparations

| Sample No. | Sephadex G-10 | | Sephadex G-75 | | Bio-Gel P-2 | |
|---|---|---|---|---|---|---|
|  | Mol. Wt. | Kd | Mol. Wt. | Kd | Mol. Wt. | Kd |
| 2 | > 700 | 0.0 | — | — | > 1,800 | 0.0 |
| 4 | > 700 | 0.0 | 30,000 | 0.10 | > 1,800 | 0.0 |
| 1 | > 700 | 0.0 | 50,000 | 0.0 | > 1,800 | 0.0 |
|  |  |  | 3,000 | 0.6 |  |  |
| 3 | > 700 | 0.0 | 50,000 | 0.0 | > 1,800 | 0.0 |
| 8 | > 700 | 0.0 | 10,000 | 0.2 | > 1,800 | 0.0 |
| 6 | > 700 | 0.0 | 50,000 | 0.0 | > 1,800 | 0.0 |
| 7 | > 700 | 0.0 | 50,000 | 0.0 | > 1,800 | 0.0 |
| 5 | > 700 | 0.0 | 50,000 | 0.0 | > 1,800 | 0.0 |

Although gel filtration does not give a precise measurement of molecular weight, reasonable estimates of the molecular size of the saponins and microbial toxin can be made by comparing the movement of the standards in the Columns which have known molecular weights. Referring to Table 3 above, it appears that the antimicrobial toxin within most of the samples has an approximate molecular size of between about 140 and about 200. Sample 6 contains a toxin of considerably greater size, e.g., about 550 to about 600.

As shown in Table 5, the saponins behave as though their apparent molecular size was greater than 700 on the Sephadex G–10 column, and greater than 2,000 on the Bio-Gel P2 column. The saponins in samples 2–7 all behave as if they have a molecular size greater than 10,000 on the Sephadex G–75 column. It is noted that in Sample 1, the majority of the saponin (80%) behaved as though it had an apparent molecular weight greater than or equal to 50,000, and a minor amount (20%) behaved as though it had an apparent molecular weight in the range of 2,000 to 4,000.

As a conclusion, the above gel filtration data clearly indicates that the majority of the saponin molecules in aqueous solution have an apparent molecular weight greater than 10,000 and that the antimicrobial toxin present In these commercial preparations has a molecular size of between 140–600.

EXAMPLE III

An apparatus very similar to that schematically depicted in the drawings was set up wherein ultrafiltration vessel 10 was a Model 52 Amicon stirred ultrafilter cell, and valve 26 was a concentration dialysis selector CDS10, both produced by Scientific Systems Division of Amicon Corporation of Lexington, Mass. In addition, solutions of three commercially available saponins were prepared in normal saline in a concentration of 20% (W/V). The ultrafiltration cell was attached to a 2 liter solvent tank 36. Approximately 1 liter of normal saline was added to solvent tank 36. Next, several runs were made with 20 milliliter samples of each of the above-described solutions of commercial saponins. In each run the system was pressurized to 50 psi with air and the cell was operated as described above in connection with the drawings until 5 volumes (100 milliliters) had passed through the system (out conduit 22). The runs were made utilizing different microporous filter membranes 14 and specifically utilizing the following microporous filter membranes which were obtained from Scientific Systems Division of Amicon Corporation of Lexington, Mass. as set forth in Table 6 below:

TABLE 6

| Type of Membrane | Approx. Mean Pore Diameter (angstroms) | Exclusion Limit (Molecular Weight) |
| --- | --- | --- |
| UM05 | 11 | 500 |
| UM2 | 12 | 1,000 |
| PM10 | 18 | 10,000 |
| PM30 | 24 | 30,000 |

The effluent from conduit 22 as well as solution 12 which remained within chamber 10a of ultrafiltration vessel 10 were assayed for hemolytic potency by the method set forth in Example I above. The percent saponin which was lost during the dialysis operation was then determined. The sensitivity of the test was limited to losses greater than or equal to 5%. The results are set forth in Table 7 below:

TABLE 7

% Saponin Lost During Dialysis Using Various Ultrafilter Membranes

| Brand | Grade | UM05 | UM2 | PM10 | PM30 |
| --- | --- | --- | --- | --- | --- |
| Cal Bio Chem | reagent | < 5% | < 5% | < 5% | < 5% |
| Nutritional Bio-chemical Corp. | reagent | < 5% | < 5% | < 5% | < 5% |
| Coulter Chemical Co. | reagent | < 5% | < 5% | < 5% | 7.5% |

As is illustrated in Table 7, the majority of the saponin molecules remain above the PM10 membrane while a small amount does appear to be passing to the PM30 membrane. Since the PM10 membrane has an exclusion limit of approximately 10,000 molecular weight and the PM30 membrane has an exclusion limit of approximately 30,000 molecular weight, this data clearly shows that saponins have an apparent molecular weight in aqueous solution on these ultra filters of between 10,000 and 50,000.

EXAMPLE IV

Example III was repeated except that only 10 milliliters of each of the saponin solutions was placed in the ultra filtration cell vessel 10. The system was operated until 5 volumes (50 milliliters) of effluent had passed through the membranes and the resulting material within chamber 10a of ultrafiltration vessel 10, and the effluent was then assayed for any bacterial activity by the method set forth in the Example I above. The results are set forth in Table 8 below:

TABLE 8

% of Antibacterial Toxin Which Passed Through the Various Ultrafilter Membranes

| Brand | UM05 | UM2 | PM10 | PM30 |
| --- | --- | --- | --- | --- |
| Calbiochem | >99% | >99% | >99% | >99% |
| NBC | >99% | >99% | >99% | >99% |
| Coulter | >99% | >99% | >99% | >99% |

The data clearly indicates that there is no appreciable retardation of the toxin by any of the filters. Since UMO5 has an exclusion limit that is approximately 500 molecular weight it appears that the toxins have an apparent molecular weight which is less than 500 while in aqueous solution.

While this invention has been described in relation to its preferred embodiments, it is to be understood that various modifications thereof will now be apparent to one skilled in the art upon reading this specification and it is intended to cover such modifications as fall within the scope of the appended claims.

For example, it is to be understood that various processes and equipment can be utilized to separate the lower molecular weight toxins from the saponins in accordance with the subject invention. Any suitable ultrafiltration apparatus can be utilized. For example, instead of the stirred cell ultrafiltration disclosed in the preferred embodiment, a thin channel system can be utilized such as the thin channel system sold under the trademark of TCF10 by Scientific Systems Division of Amicon Corporation.

I claim:

1. In a method of obtaining purified saponin from a plant source wherein a component rich in saponin and which will hemolyze red blood cells is extracted from said plant source, the improvement comprising:

removing antimicrobial toxic constituents from said saponin extract which when in aqueous solution have an apparent molecular weight of less than about 600.

2. The method of claim 1 wherein said antimicrobial toxic constituents are removed from said saponin extract by providing an aqueous solution of said saponin extract and thereafter separating toxic materials therefrom which have an apparent molecular weight in said solution below about 600.

3. The method of claim 2 wherein said antimicrobial toxic constituents are removed from said aqueous solution by gel filtration.

4. The method of claim 2 wherein said antimicrobial toxic constituents are removed from said aqueous solution by ultrafiltration.

5. The purified saponin extract produced by the process of claim 1.

6. A method of removing antimicrobial toxins from saponin extract of a plant which will hemolyze red blood cells comprising:
   a. providing an aqueous solution of said saponin extract;
   b. passing said aqueous solution through a filter membrane having a mean pore size no smaller than about 11 angstroms and no larger than about 24 angstroms to thereby cause said toxins to pass therethrough, but yet exclude said saponin molecules; and
   c. separating the excluded saponin molecules from the remaining portions of said solution which pass through said filter membrane.

7. The method of claim 6 carried out by an ultrafiltration technique wherein volumes of aqueous solvent used to form said aqueous solution are added to said aqueous solution in volumetric increments equal to the volume of the solution passing through said filter membrane as said solution passes through said membrane.

8. The method of claim 6 wherein said aqueous solution comprises from about 5 to about 50% (W/V) of said saponin extract.

9. The method of claim 8 wherein said aqueous solvent is distilled water.

10. The method of claim 8 wherein said aqueous solvent is normal saline solution.

11. The purified saponin extract produced by the process of claim 6.

12. A method of removing antimicrobial toxins from saponin extract of a plant which will hemolyze red blood cells comprising:
   a. providing an aqueous solution of said saponin extract; and
   b. removing toxic materials therefrom which have an apparent molecular weight of said solution below about 600.

13. The method of claim 12 wherein said toxic materials have an apparent molecular weight in aqueous solution in the range of from about 140 to about 600.

14. The method of claim 12 further comprising using the product of claim 12 to hemolyze red blood cells in a blood sample, and thereafter subjecting said sample to a bacteria culturing process.

* * * * *